United States Patent
Nguyen et al.

(10) Patent No.: US 7,128,158 B2
(45) Date of Patent: Oct. 31, 2006

(54) LIGHTWEIGHT COMPOSITE PARTICULATES AND METHODS OF USING SUCH PARTICULATES IN SUBTERRANEAN APPLICATIONS

(75) Inventors: Philip D. Nguyen, Duncan, OK (US); Lewis R. Norman, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 162 days.

(21) Appl. No.: 10/852,785

(22) Filed: May 25, 2004

(65) Prior Publication Data
US 2005/0284631 A1    Dec. 29, 2005

(51) Int. Cl.
*E21B 43/26* (2006.01)
*E21B 43/267* (2006.01)

(52) U.S. Cl. .................... 166/308.3; 166/280.2
(58) Field of Classification Search ...................... None
See application file for complete search history.

(56) References Cited

U.S. PATENT DOCUMENTS

| | | | |
|---|---|---|---|
| 6,583,217 B1 | 6/2003 | Li et al. | 524/650 |
| 6,599,863 B1* | 7/2003 | Palmer et al. | 507/219 |
| 2004/0043906 A1* | 3/2004 | Heath et al. | 507/200 |

* cited by examiner

*Primary Examiner*—Zakiya W. Bates
(74) *Attorney, Agent, or Firm*—Robert A. Kent; Baker Botts

(57) ABSTRACT

The present invention relates to lightweight composite particulates and their use in subterranean applications such as production enhancement and completion. One embodiment of the present invention provides a method of forming a lightweight particulate suitable for use as proppant or gravel in a subterranean operation comprising the steps of forming a substantially homogeneous mixture of PET and a filler material; forming the homogeneous mixture into particulates suitable for use in a subterranean environment. Other embodiments of the present invention provide methods of treating, fracturing, and gravel packing a chosen zone in a subterranean formation.

12 Claims, No Drawings

US 7,128,158 B2

LIGHTWEIGHT COMPOSITE PARTICULATES AND METHODS OF USING SUCH PARTICULATES IN SUBTERRANEAN APPLICATIONS

BACKGROUND OF THE INVENTION

The present invention relates to improved particulates and methods of using such particulates in subterranean applications. More particularly, the present invention relates to composite particulates and their use in subterranean applications such as production enhancement and completion.

Particulates are used in a variety of operations and treatments performed in oil and gas wells. Such operations and treatments include, but are not limited to, production stimulation operations such as fracturing and well completion operations such as gravel packing.

An example of a production stimulation operation using a servicing fluid having particles suspended therein is hydraulic fracturing. That is, a type of servicing fluid, referred to in the art as a fracturing fluid, is pumped through a well bore into a subterranean zone to be stimulated at a rate and pressure such that fractures are formed and extended into the subterranean zone. The fracture or fractures may be horizontal or vertical, with the latter usually predominating, and with the tendency toward vertical fractures generally increasing with the depth of the formation being fractured. Generally, fracturing fluids are viscous fluids in the form of gels, emulsions, or foams. The particulate materials used in these operations are often referred to as proppant. The proppant is deposited in the fracture and functions, inter alia, to maintain the integrity of the fracture open while maintaining conductive channels through which such produced fluids can flow upon completion of the fracturing treatment and release of the attendant hydraulic pressure.

Particulates also are used in well completion operations such as gravel packing. Gravel packing treatments are used, inter alia, to reduce the migration of unconsolidated formation particulates into the well bore. In gravel packing operations, particulates, often referred to in the art as gravel, are carried to a well bore in a subterranean producing zone by a servicing fluid that acts as a gravel carrier fluid. That is, the particulates are suspended in a carrier fluid, which may be and usually is viscosified, and the carrier fluid is pumped into a well bore in which the gravel pack is to be placed. As the particulates are placed in or near the zone, the carrier fluid leaks off into the subterranean zone and/or is returned to the surface. The resultant gravel pack acts as a sort of filter to prevent the production of the formation solids with the produced fluids. Traditional gravel pack operations involve placing a gravel pack screen in the well bore before packing the surrounding annulus between the screen and the well bore with gravel. The gravel pack screen is generally a filter assembly used to support and retain the gravel placed during the gravel pack operation. A wide range of sizes and screen configurations is available to suit the characteristics of a well bore, the production fluid, and any particulates in the subterranean formation. Gravel packs are used, among other reasons, to stabilize the formation while causing minimal impairment to well productivity.

Also, as more wells are being drilled in deep water and in high temperature zones, gravel packing in long, open horizontal well bores is becoming more prevalent. Completion operations in these wells generally involve the use of reduced-specific gravity particulates that are resistant to degradation in the presence of hostile conditions such as high temperatures and subterranean treatment chemicals. Using lightweight particulates may enhance the complete packing of the well bore annulus between the well bore and the sand screens, and possibly minimize the potential of particulate settling, leaving behind void spaces on top of the gravel pack. Void spaces on top of a gravel pack may be problematic as formation sand or fines often fill such voids during production, which may result in a significant reduction of produced fluids from the well. Erosion of the screen could also occur at a particular location where production flow rate is concentrated at one point on the screen, which in turn allows the gravel or formation materials to produce along with the production fluids.

In some situations, hydraulic fracturing and gravel packing operations may be combined into a single treatment. Such treatments are often referred to as "frac pack" operations. In some cases, the treatments are completed with a gravel pack screen assembly in place with the hydraulic fracturing treatment being pumped through the annular space between the casing and screen. In this situation, the hydraulic fracturing treatment ends in a screen-out condition, creating an annular gravel pack between the screen and casing. In other cases, the fracturing treatment may be performed prior to installing the screen and placing a gravel pack.

Traditional high-strength particulates used in fracturing applications often exhibit too high of a specific gravity to be suspended in lower viscosity fluids. Lower viscosity fluids are desirable because the viscosifiers and crosslinkers used to create them are often expensive. Moreover, viscosifier tends to build up on the walls of the formation in the form of a filter cake that may black the production of fluids once it is desirable to place the formation on production. Moreover, residue of viscosifiers used in subterranean applications often remains on the particulates transported in the viscosified fluid and may reduce the conductivity of packs made from such particulates. While low specific gravity particulates are suitable for use in lower viscosity fluids, these low specific gravity particulates generally are not able to withstand significant closure stresses over time at elevated subterranean temperatures. Examples of such particulates include walnut hulls and thermoplastic materials, including polyolefins, polystyrene divinylbenzene, polyfluorocarbons, polyethers etherketones and polyamide imides, that tend to soften and deform under stress when exposed to temperatures above about 150° F.

SUMMARY OF THE INVENTION

The present invention relates to improved particulates and methods of using such particulates in subterranean applications. More particularly, the present invention relates to lightweight composite particulates and their use in subterranean applications such as production enhancement and completion.

One embodiment of the present invention provides a method of forming a lightweight particulate suitable for use as proppant or gravel in a subterranean operation comprising the steps of forming a substantially homogeneous mixture of polyethylene terephthalate (PET) and a filler material; forming the homogeneous mixture into particulates suitable for use in a subterranean environment.

Another embodiment of the present invention provides a method of treating a subterranean formation comprising the steps of providing a servicing fluid comprising a fluid component and particulates wherein the particulates comprise a composite particulate material that comprises PET and a filler material; placing the servicing fluid into the subterranean formation at a pressure sufficient to create or enhance at least one fracture therein.

Another embodiment of the present invention provides a method of fracturing a subterranean formation comprising the steps of providing a fracturing fluid comprising a fluid component and particulates wherein the particulates comprise a composite particulate material that comprises PET and a filler material; placing the fracturing fluid into the subterranean formation at a pressure sufficient to create or enhance at least one fracture therein.

Another embodiment of the present invention provides a method of installing a gravel pack in or neighboring a chosen zone in a subterranean formation comprising the steps of providing a gravel pack fluid comprising a fluid component and particulates wherein the particulates comprise a composite particulate material that comprises PET and a filler material; and, introducing the gravel pack composition to the well bore such that the particulates form a gravel pack substantially adjacent to the chosen zone in the subterranean formation.

Other and further features and advantages of the present invention will be readily apparent to those skilled in the art upon a reading of the description of preferred embodiments that follows.

DESCRIPTION OF PREFERRED EMBODIMENTS

The present invention relates to improved particulates and methods of using such particulates in subterranean applications. More particularly, the present invention relates to composite particulates and their use in subterranean applications such as production enhancement and completion.

The composite particulates of the present invention are lightweight and high strength, and comprise a thermoplastic material and a filler material. The particulates may comprise from about 5% to about 70% filler material by weight of the overall particulate. The particulates of the present invention will generally have a range of specific gravities of from about 1.1 to about 2.0; they also will exhibit crush strengths ranging from about 1,000 psi to about 16,000 psi. By way of example, in one embodiment, the present invention provides a composite particulate comprising about 30% by weight polyethylene terephthalate (PET) and about 70% by weight ASTM type F fly ash that has been shown to withstand pressures of about 16,000 psi without substantially degrading. The specific gravity and crush strength of the particulates of the present invention may be influenced, in part, by adjusting, inter alia, the relative percentage of thermoplastic material to filler material. The relative amounts of filler material and thermoplastic material may be adjusted by one skilled in the art to tailor the final particulate to achieve desirable physical properties, including particle density, bulk density, crush strength, agility, etc.

The filler material of the present invention may be any micro-sized particle that is compatible with the thermoplastic material and with the ultimate use of the particulate. Suitable filler materials include, but are not limited to, cenospheres, microspheres, carbon black, particulate rubber, particulate nut shells, cement particles, particulate wood, particulate rice hulls, fly ash, and combinations thereof.

One particularly preferred filler material is fly ash. Fly ash, as referred to herein, refers to a finely divided residue resulting from the combustion of carbonaceous material, such as ground or powdered coal, and generally carried by generated flue gases. One preferred type of fly ash is ASTM class F fly ash, having a Blaine fineness of about 10,585 square centimeters per gram and is commercially available from Halliburton Energy Services, Inc., of Houston, Tex., under the trade designation "POZMIX®." In other embodiments of the present invention, the combustion product may comprise "bottom ash." Bottom ash, as referred to herein, refers to a finely divided residue resulting from the combustion of carbonaceous material that generally accumulates on the floor of an incinerator. Another preferred type of fly ash is a high-lime (ASTM class C) fly ash produced from combustion of low-sulfur, sub-bituminous coal that originates from at least the Powder River Basin near Gillette, Wyo. Low carbon, high calcium content and self-cementitious properties characterize this type of fly ash. Generally, ASTM class C fly ash contains more fine and less coarse particles than low-lime (ASTM class F) fly ash, is composed of 20 to 30 weight percent crystalline compounds with the remainder being amorphous, glassy materials, and comprises spheroidal particles having a typical particle size distribution from 1 to 150 microns diameter, but preferably particles with sizes 65 micron and larger. In certain preferred embodiments of the present invention when using fly ash as the filler material, after sampling the fly ash, the moisture content of the fly ash preferably is maintained at less than 1% by, e.g., oven drying the fly ash to reduce hydration and pozzolanic reactions, prior to composite production. Regardless of the fly ash chosen, it preferably comprises substantially spherical particles.

Thermoplastic materials suitable for use in the present invention include PET. Suitable PET materials may have a completely amorphous structure, a partially crystalline structure, or anything in between. Upon heating, these suitable thermoplastic polymers can melt, becoming sufficiently free flowing to permit mold filling. In certain embodiments, both amorphous and partially crystalline PET may be used.

The light composite particulates of the present invention may be made by combining the thermoplastic material and the filler material into a uniform mixture, and then forming particulates having a desired shape and suitable properties (such as crush resistance and specific gravity) for use in subterranean applications. In one embodiment, the thermoplastic material and the filler material are combined by mixing the chosen thermoplastic material with the chosen filler material in a suitable container such that the filler material becomes substantially dispersed throughout the thermoplastic material, and then forming the composite into substantially spherical particles suitable for use in subterranean operations. Operations include any subterranean treatment operation wherein particulates may be used, which include, but are not limited to, fracturing and gravel packing operations. The filler material may be added to the thermoplastic material while it is melted or may be added to the thermoplastic material after it has been melted so long as the distribution of the filler material throughout the thermoplastic material is substantially uniform.

Suitable processes for producing particulates suitable for use in a subterranean operation are well known in the art. One such method that may be used to produce the particulates of the present invention involves pouring the mixture of filler material and thermoplastic material onto a slanted, rotating table to create substantially uniform, substantially spherical particulates. The size of the particulate may be influenced, inter alia, by affecting the speed of the table's rotation and the angle of the table's slant. In another method, the mixed composite material may be extruded through a molding device with multiple openings to form strands or rod shape structures as they are cured, usually with the use of a fluidized air column or cooling tower. The cured strands may be then chopped, cut, or crushed into smaller fragments before sieving to desirable size.

The term "spherical" is used herein to designate particulates having an average ratio of minimum diameter to maximum diameter of about 0.7 or greater. The size of the particulates of the present invention is generally about 8 U.S. mesh or smaller. Having such a particle size allows the particulates to be useful in sand control operations and production enhancing operations. One skilled in the art with the benefit of this disclosure will recognize the appropriate size for a given application. Once formed, the particulates may be crushed, chopped, or otherwise manipulated to form smaller-sized particulates if desired. Moreover, the particulates (whether or not they have been manipulated into smaller-sized particulates) may be sieved to obtain a more uniform particle size distribution.

Many subterranean treatments involve suspending particulates in a treatment fluid and carrying those particulates into the subterranean formation for a desired purpose. Generally, the treatment fluid should exhibit a sufficient viscosity that is high enough to neutrally suspend the particulates. Generally, the lightweight composite particulates of the present invention allow for the use of relatively lower-viscosity servicing fluids. In one embodiment of the present invention, a treatment fluid comprising a hydrocarbon or water carrier fluid component and at least a portion of the lightweight composite particulates of the present invention is pumped into a subterranean formation. In some embodiments, these particulates may be dropped from the fluid into a desired zone in the subterranean formation or a well bore penetrating the subterranean formation. In some fracturing embodiments, the particulates may be dropped in at least one fracture to aid in maintaining the integrity of that fracture. In a gravel packing embodiment, the particulates may be dropped out of the fluid in a manner so as to create a gravel pack that is in or neighbors a chosen zone in the subterranean formation. In some embodiments of the methods of the present invention, the lightweight composite particulates may be included in a treatment fluid in an amount from about 0.01 pounds per gallon to about 25 pounds per gallon.

One embodiment of a method of the present invention provides an improved method of treating a subterranean formation using a treatment fluid comprising a hydrocarbon or water carrier fluid and lightweight composite particulates of the present invention suspended therein. Such embodiments of the present invention provide methods of treating a subterranean formation comprising the steps of providing a servicing fluid comprising a fluid component and particulates wherein the particulates comprise a composite particulate material that comprises PET and a filler material; placing the servicing fluid into the subterranean formation at a pressure sufficient to create or enhance at least one fracture therein.

Still another method of the present invention provides an improved method of hydraulic fracturing using lightweight composite particulates of the present invention. Some hydraulic fracturing methods of present invention, comprise the steps of providing a fracturing fluid comprising a fluid component and particulates wherein the particulates comprise a composite particulate material that comprises PET and a filler material; placing the fracturing fluid into the subterranean formation at a pressure sufficient to create or enhance at least one fracture therein.

Another method of the present invention provides an improved method of installing a gravel pack in or neighboring a chosen zone in a subterranean formation comprising the steps of providing a gravel pack fluid comprising a fluid component and particulates wherein the particulates comprise a composite particulate material that comprises PET and a filler material; and, introducing the gravel pack composition to the well bore such that the particulates form a gravel pack substantially adjacent to the chosen zone in the subterranean formation.

Therefore, the present invention is well adapted to carry out the objects and attain the ends and advantages mentioned as well as those that are inherent therein. While numerous changes may be made by those skilled in the art, such changes are encompassed within the spirit and scope of this invention as defined by the appended claims.

What is claimed is:

1. A method of treating a subterranean formation comprising the steps of:
   providing a low viscosity servicing fluid comprising a fluid component and particulates, wherein the particulates comprise a composite particulate material that comprises polyethylene terephthalate and a filler material; and
   introducing the servicing fluid into the subterranean formation at a pressure sufficient to create or enhance at least one fracture therein.

2. The method of claim 1 wherein the particulates comprising polyethylene terephthalate and a filler material are substantially spherical.

3. The method of claim 1 wherein the filler material comprises a material selected from the group consisting of: cenospheres, microspheres, carbon black, particulate rubber, particulate nut shells, particulate wood, particulate rice hulls, fly ash, and a combination thereof.

4. The method of claim 1 wherein the particulates comprise from about 10% to about 70% filler material by weight of the total particulate.

5. The method of claim 1 wherein the particulates comprise at least about 30% filler material by weight of the total particulate.

6. The method of claim 1 wherein the fracturing fluid composition comprises from about 0.01 pounds of particulate per gallon to about 25 pounds of particulate per gallon.

7. A method of fracturing a subterranean formation comprising the steps of:
   providing a low viscosity fracturing fluid comprising a fluid component and particulates wherein at least a portion of the particulates comprise composite particulates that comprise polyethylene terephthalate and a filler material;
   introducing the fracturing fluid into the subterranean formation at a pressure sufficient to create or enhance at least one fracture therein; and,
   depositing at least a portion of the particulates in the fracture.

8. The method of claim 7 wherein the particulates comprising polyethylene terephthalate and a filler material are substantially spherical.

9. The method of claim 7 wherein the filler material comprises a material selected from the group consisting of: cenospheres, microspheres, carbon black, particulate rubber, particulate nut shells, particulate wood, particulate rice hulls, fly ash, and a combination thereof.

10. The method of claim 7 wherein the particulates comprise from about 10% to about 70% filler material by weight of the total particulate.

11. The method of claim 7 wherein the particulates comprise at least about 30% filler material by weight of the total particulate.

12. The method of claim 7 wherein the fracturing fluid composition comprises from about 0.01 pounds of particulate per gallon to about 25 pounds of particulate per gallon.

* * * * *